United States Patent
Grinbergs et al.

(10) Patent No.: US 10,208,979 B2
(45) Date of Patent: Feb. 19, 2019

(54) PLANAR PLATE CORE AND METHOD OF ASSEMBLY

(71) Applicant: AIRIA LEASING INC., London (CA)

(72) Inventors: Peter Karl Grinbergs, Dorchester (CA); William Kwan, London (CA); Gerard Reiger, London (CA)

(73) Assignee: AIRIA LEASING INC., London, Ontario (CA)

( * ) Notice: Subject to any disclaimer, the term of this patent is extended or adjusted under 35 U.S.C. 154(b) by 0 days.

(21) Appl. No.: 15/284,992

(22) Filed: Oct. 4, 2016

(65) Prior Publication Data

US 2017/0023273 A1    Jan. 26, 2017

Related U.S. Application Data

(62) Division of application No. 14/016,519, filed on Sep. 3, 2013.

(60) Provisional application No. 61/703,535, filed on Sep. 20, 2012.

(51) Int. Cl.
| | |
|---|---|
| F24F 12/00 | (2006.01) |
| F28D 9/00 | (2006.01) |
| F28F 3/04 | (2006.01) |
| F28F 13/06 | (2006.01) |
| F28F 17/00 | (2006.01) |
| F28D 21/00 | (2006.01) |
| F28F 3/08 | (2006.01) |
| B21D 53/04 | (2006.01) |

(52) U.S. Cl.
CPC .......... *F24F 12/006* (2013.01); *F28D 9/0037* (2013.01); *F28D 9/0068* (2013.01); *F28D 21/0014* (2013.01); *F28F 3/044* (2013.01); *F28F 3/046* (2013.01); *F28F 3/08* (2013.01); *F28F 13/06* (2013.01); *F28F 17/005* (2013.01); *B21D 53/04* (2013.01); *F28F 2275/025* (2013.01); *Y02B 30/563* (2013.01); *Y10T 29/49366* (2015.01)

(58) Field of Classification Search
CPC .. F24F 12/006; F28D 9/0068; F28D 21/0012; F28D 21/0014; F28D 9/0037; F28F 3/044; F28F 3/08; F28F 13/06; F28F 17/05; F28F 2275/025; F28F 17/05; B23P 15/26
USPC ...................... 29/890.039, 890.041
See application file for complete search history.

(56) References Cited

U.S. PATENT DOCUMENTS

| | | | | |
|---|---|---|---|---|
| 2,321,110 A | * | 6/1943 | Shipman | F28D 9/0037 165/160 |
| 3,590,917 A | * | 7/1971 | Huber | F25J 3/04412 165/166 |
| 3,893,509 A | * | 7/1975 | Satchwell | F28D 9/0037 165/166 |
| 4,099,928 A | * | 7/1978 | Norback | B21D 22/027 165/166 |
| 4,116,271 A | * | 9/1978 | De Lepeleire | F28D 9/0006 165/166 |

(Continued)

*Primary Examiner* — Tho V Duong
(74) *Attorney, Agent, or Firm* — Tutunjian & Bitetto, P.C.

(57) ABSTRACT

An apparatus includes a core configured for use in an energy exchanger. The core includes a plurality of stacked and spaced planar plate pairs including a top plate and a bottom plate to support fluid flow of a first fluid flow and a second fluid flow. A plurality of dimples is provided by instances of the plate pairs. The plurality of dimples are arranged to generate substantially counter current flow between the first fluid flow and the second fluid flow.

3 Claims, 13 Drawing Sheets

(56) References Cited

U.S. PATENT DOCUMENTS

| | | | |
|---|---|---|---|
| 4,384,611 A * | 5/1983 | Fung | F28D 9/0025 165/166 |
| 6,378,604 B1 * | 4/2002 | Feind | B29C 65/5071 165/165 |
| 8,235,093 B2 | 8/2012 | Grinbergs et al. | |
| 2002/0005280 A1 * | 1/2002 | Wittig | F28D 9/0037 165/166 |

* cited by examiner

FIGS. 4A to 4E
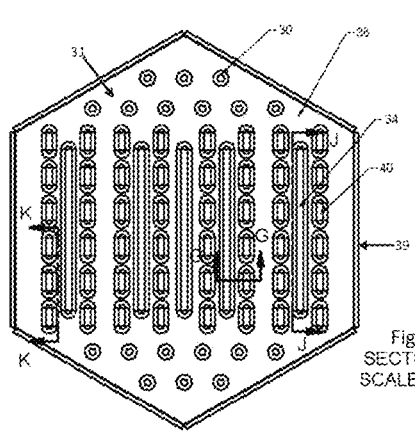
Fig. 4A
CORE STACK ALTERNATES
BETWEEN 36 AND 38 SEE
DETAIL G
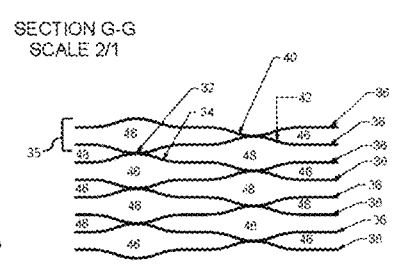
SECTION G-G
SCALE 2/1
Fig. 4D
SECTION J-J
SCALE 2/3
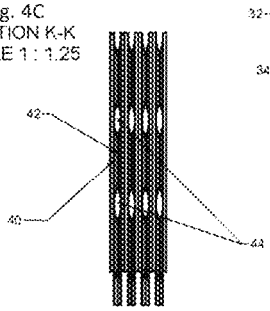
Fig. 4C
SECTION K-K
SCALE 1 : 1.25
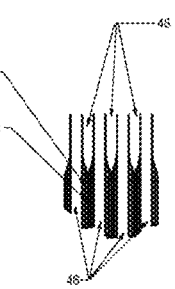
Fig. 4B
DETAIL L
SCALE 1.33 : 1

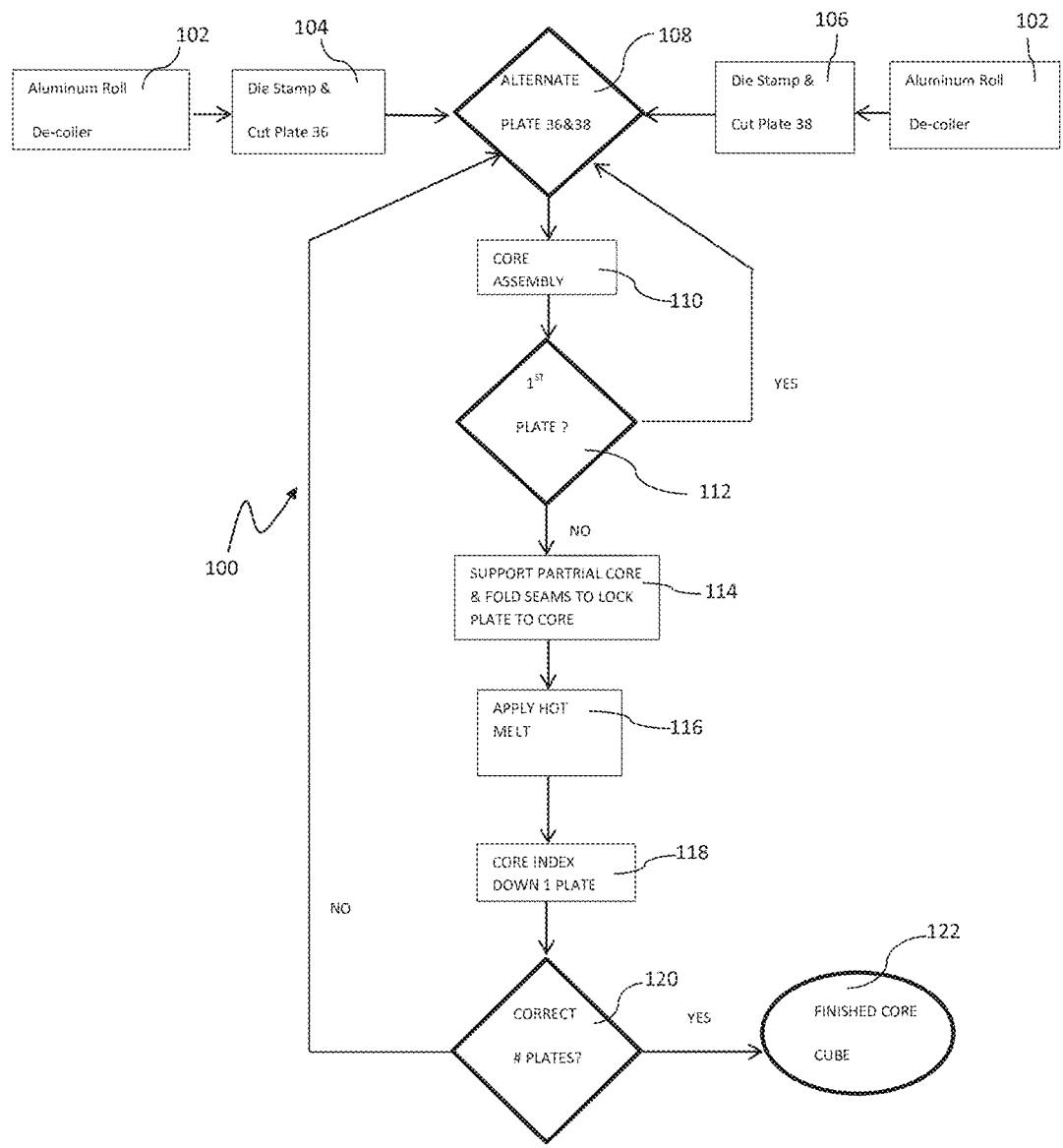

FIGS. 7A-7C
FIG. 7A
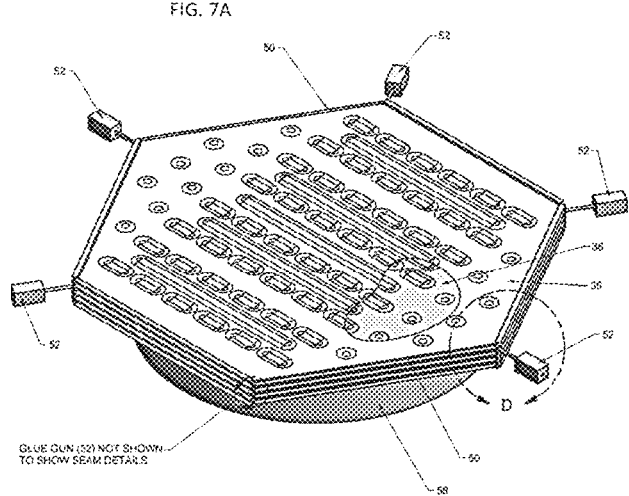
FIG. 7B
SEAM DETAIL C
SCALE 2 : .5
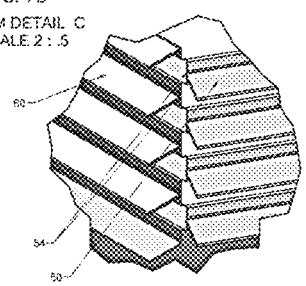
FIG. 7C
HOT MELT DETAIL D
SCALE 1 : 1
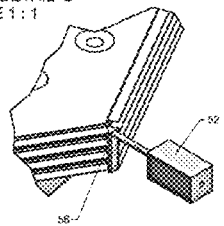

PLANAR PLATE CORE AND METHOD OF ASSEMBLY

CROSS-REFERENCE TO RELATED APPLICATION

This application claims the benefit of U.S. Provisional Application No. 61/703,535 filed on Sep. 20, 2012, which is incorporated by reference herein in its entirety.

TECHNICAL FIELD

The described embodiments relate to the field of energy exchange systems and more particularly to planar plate-type cores and methods of assembly of same used in heat recovery ventilator (HRV) systems and energy recovery ventilation systems (ERV).

BACKGROUND

A heat recovery ventilator (HRV) is a mechanical device that incorporates a heat exchanger with a ventilation system for providing controlled ventilation into a building. The heat exchanger heats or cools incoming fresh air using exhaust air. Energy/Enthalpy Recovery Ventilators (ERV) can exchange moisture in addition to heat between two air streams. ERV systems typically include a sheet metal enclosure, fans to move the air streams, ducting, filters and control components. A key component in an HRV/ERV that transfers the heat and water vapour between the air streams is called the core. A core is typically constructed using a plurality of plates that are stacked, sealed and configured to accommodate fluid streams flowing in either cross-flow or counter-flow configuration between alternate plate pairs, so that heat and water vapour are transferred via the plates. Planar plate-type cores for HRV/ERV implementations and other applications are readily scalable. However, meeting high efficiencies targets is a challenge using conventional designs.

SUMMARY

Certain exemplary embodiments can provide an apparatus, comprising: a core being configured for use in an energy exchanger, the core including a plurality of stacked and spaced planar plate pairs including a top plate and a bottom plate to support fluid flow of a first fluid flow and a second fluid flow; and a plurality of dimples being provided by instances of the plurality of stacked and spaced planar plate pairs, and the plurality of dimples being arranged to generate substantially counter current flow between the first fluid flow and the second fluid flow.

Certain exemplary embodiments can provide a method of producing a core having a plurality of planar plates; (a) folding seams of two of the plurality of planar plates to form a lock seam to hold the plates together; (b) injecting an adhesive at each seam to attach and space the plates; and (c) repeating steps (a) and (b) until the plurality of planar plates are joined. In exemplary embodiments, the method forms a core with multiple channels for the first and second fluid.

Certain exemplary embodiments can provide an apparatus including a core configured for use in an energy exchange between fluids. The core includes a plurality of stacked and spaced planar plate pairs including a top plate and a bottom plate to support fluid flow of a first fluid flow and a second fluid flow. A plurality of dimples is provided by instances of the plate pairs. The plurality of dimples are arranged to generate substantially counter current flow between the first fluid flow and the second fluid flow.

Certain exemplary embodiments can provide an apparatus, comprising: an energy recovery system, including: an energy exchanger; a core being configured for use in the energy exchanger, the core including a plurality of stacked and spaced planar plate pairs including a top plate and a bottom plate to support fluid flow of a first fluid flow and a second fluid flow; and a plurality of dimples being provided by instances of the plurality of stacked and spaced planar plate pairs, and the plurality of dimples being arranged (i) to generate substantially counter current flow between the first fluid flow and the second fluid flow and (ii) to draw condensation from any one of the first fluid flow and the second fluid flow in any plate orientation.

Certain exemplary embodiments can provide a method of joining a plurality of plates used in a core. The method includes folding seams of the plurality of stacked and spaced planar plate pairs to lock the plurality of stacked and spaced planar plate pairs together. The method also includes applying an adhesive at the seams that are folded to attach and space the plurality of stacked and spaced planar plate pairs.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIGS. 4A-4E are illustrations of a planar plate core according to another embodiment;

FIG. 6 is a flowchart showing a method of assembling a core according to an embodiment;

FIGS. 7A, 7B, and 7C illustrate components used to practice the method of FIG. 6.

Figure 1:
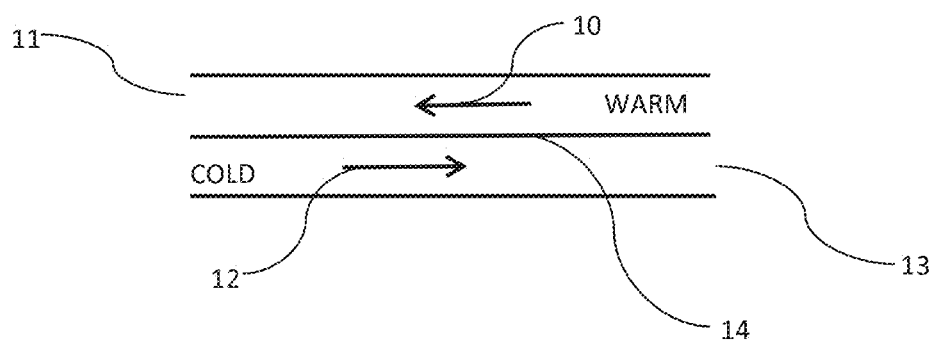
FIG. 1 is a schematic illustration of counter current fluid flow over a plate.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a".

For optimal heat exchange, fluid (air) flow in a core of an HRV/ERV is counter current, as shown schematically in FIG. 1. In general, cold air flow 12 from outside—typically fresh air supplied to a building during winter—heat exchanges with warm air flow 10 from within the building—typically exhaust from the building during winter. The cold air flow 12 entering exchanges heat with cooled warm air exiting outlet 11 and the warm air flow 10 entering exchanges with the warmed cool air exiting the outlet 13. The warm air flow 10 and the cold air flow 12 are separated by a divider 14 such as an aluminum plate. A temperature gradient across the two sides of the divider 14 is maximized to promote heat exchange.

Figure 2:
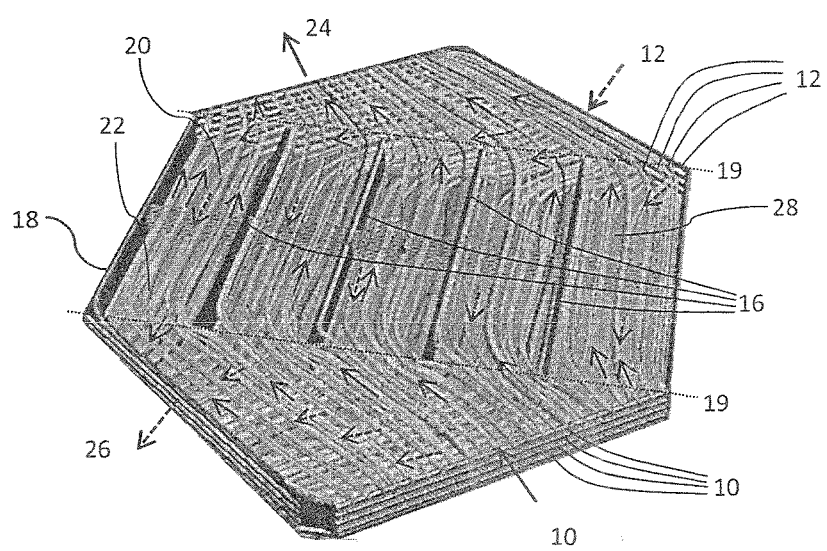
FIG. 2 is a modelled representation of an ideal fluid flow pattern in a core.

FIG. 2 illustrates a modelled representation of an ideal fluid flow pattern in a core 18 showing four cold air/fluid flows 12 and four warm air flows 10. The core 18 includes a plurality of stacked plate pairs 35 to support the cold and warm fluid flows. The core 18 is designed to provide counter current heat exchange in a middle region of the core 18. This ideal counter current flow pattern can be achieved with extended length fluid directing rails 16 arranged in a middle of the core 18, defined as being between dotted lines 19 of the core 18. Streamlines for one hot side 22 and one cold side 20 are designated in FIG. 2. The warm/hot fluid 10 enters from the bottom right of the core 18 and the cold air/fluid flow 12 enters from the top right of the core 18. The fluid directing rails 16 are spaced throughout the middle region of the core 18. Fluid flow is opposite to each other in areas where the fluid directing rails 16 are present. Cooled warm-side fluid 24 is expelled at the top left of the core 18. Warmed cold-side fluid 26 is expelled at the bottom left of the core 18. An aluminum plate 28 separates hot and cold fluids is shown as transparent in FIG. 2 to help illustrate the streamlines 20 and 22. The flow pattern is the same as FIG. 1.

FIGS. 3A-3D illustrates various schematic views of a planar plate core 29 according to an embodiment. The planar plate core 29 includes a plurality of stacked planar plate pairs 35 consisting of a bottom plate 36 and a top plate 38. In the embodiment illustrated, the plates 36/38 are hexagonal but other geometries (square, rectangular, circular, etc.) are possible depending on the particular HRV/ERV implementation. Each plate 36/38 include a plurality of symmetrically arranged instances of the circular/round dimples 30 arranged to establish gaps 44 between the stacked plate pairs 35. The gaps 44 between the plate pairs direct fluid flow and leave spaces allowing for condensate drainage. Warm fluid/air regions 46 are designated with reference 46 and cold fluid/air regions 48 are designed with reference 48.

Figures 3A, 3B, 3C, 3D:
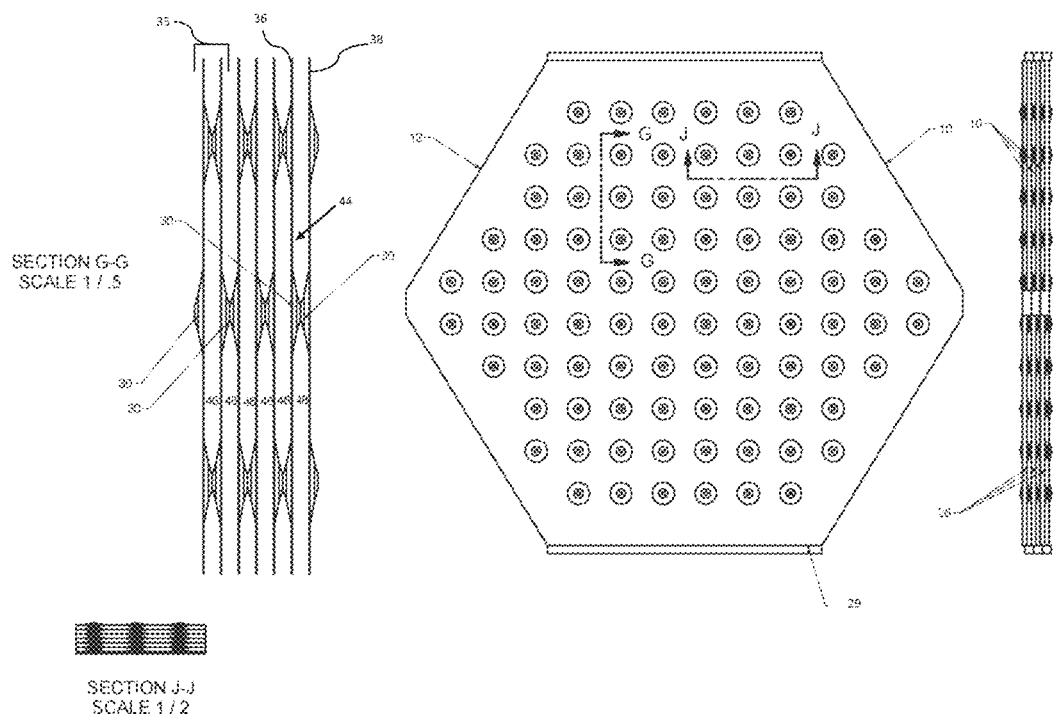
FIGS. 3A-3D are illustrations of a planar plate core according to one embodiment.
Figure 3E:
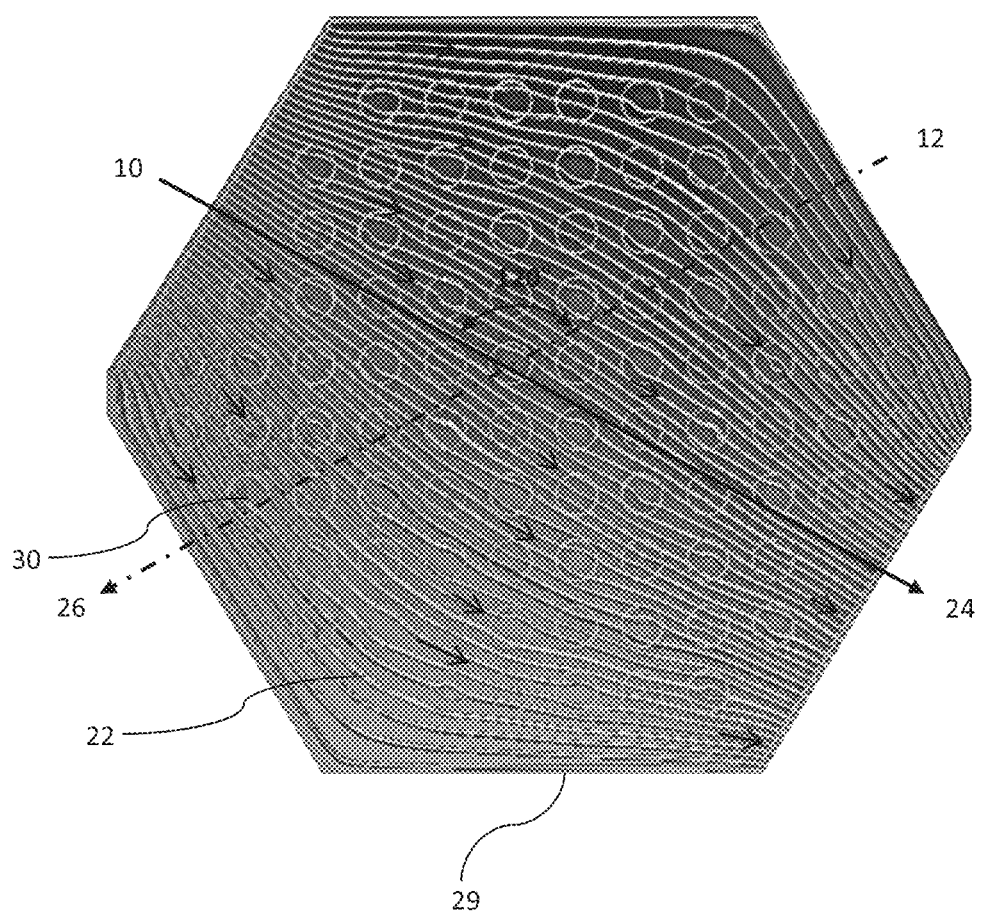
FIG. 3E is a modelled simulation of fluid flow for the core of FIGS. 3A-3D.

To establish the gaps 44 and provide spacing between the bottom plate 36 and the top plate 38 and the joined stacked planar plate pairs 35, one of the circular dimples 30 from the top plate 38 protrudes into the airflow, which rests against one of the circular dimples 30 protruding into the bottom plate 36. The dimple set alternates between protruding into and away from the airflow. The alternating dimples sets are used to space the plates 36/38 of the planar plate core 29 and to help distribute airflow. The warm side streamlines 22 for a simulation of the planar plate core 29 with a circular dimples (as per FIGS. 3A-3D) is shown in FIG. 3E. Warm air enters 10 from the top left side of the planar plate core 29 and exits from the bottom right side. The cold air flow 12 enters from the top right side and exits through the bottom left side of the planar plate core 29, in the flow channel above and below. The flow pattern in the cold side is essentially a mirror image (about left and right centerline of the core 18) of the warm side. The simulation model of FIG. 3C shows that the planar plate core 29 is effectively counter flow near the outside edges while the flow near the center of the core essentially goes straight from the inlet to the outlet. The hot and cold fluid angles approach each other at approximately 120 degrees rather than at 180 degrees. This is illustrated in FIG. 3E with the angle indicator shown between the mean streamline directions for the hot air flow 10 and the cold air flow 12 sides.

FIGS. 4A-4E illustrates various schematic views of a planar plate core 31 according to another embodiment. The planar plate core 31 includes the stacked planar plate pairs 35 consisting of the bottom plate 36 and the top plate 38, but with different dimples and dimple patterns. In particular, each plate 36/38 includes a plurality of spaced extended length dimples 32/34 oriented substantially parallel to one side 39 of the plates 36/38. Each extended length dimple 32/34 is surrounded on either side with a plurality of short elliptical dimples 40/42. A plurality of the circular/round dimples 30 (as used in planar plate core 29) are arranged at the top and bottom of each plate 36/38 as shown in FIG. 4A. The extended length dimples 32 protrude into the cold (supply) side 48 from the plate above and the extended length dimples 34 protrude into the cold (supply) side 48 from the plate below. The short elliptical dimples 40 protrude into the warm side 46 (exhaust) from the plate above and the short elliptical dimples 42 extend into the warm side 46 (exhaust) from the plate below.

The protrusion arrangements of the various dimples are best illustrated in FIG. 4B. As discussed above, warm fluid/air regions 46 can be exhaust air from an HRV/ERV (not shown) housing the planar plate core 31 and cold fluid/air regions 48 can be supply air to the HRV/ERV housing the planar plate core 31. The circular dimples 30, dimples 32/34, and dimples 40/42 and the asymmetrical pattern as shown in FIG. 4A enables controlled plate spacing, better flow distribution, and water drainage. The cold side does not have condensation so the long dimples 34 can protrude there without impeding drainage.

The warm side 46, having the short dimples 40/42, leaves the gaps 44 through which condensation and water from defrost can drain, see sectional view in FIG. 4C. The short elliptical dimples 40 on bottom plate 36 protrude into the warm side and meet with the short elliptical dimples 42 from the top plate 38.

Figure 5:
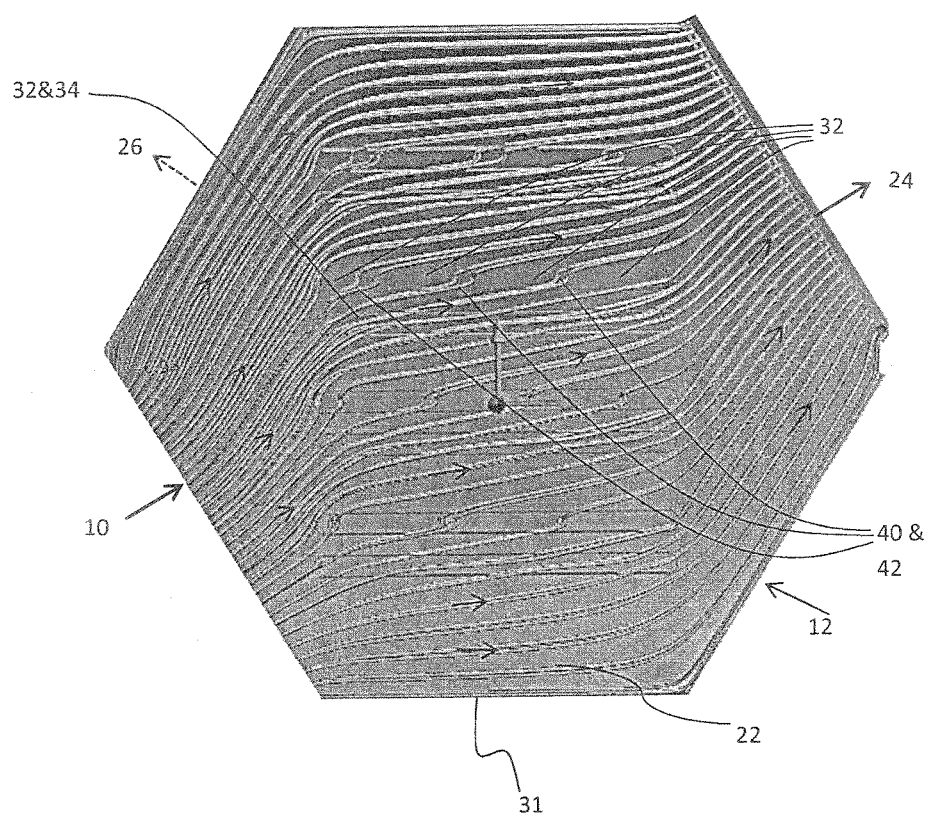
FIG. 5 is a modelled simulation of fluid flow for the core of FIGS. 4A-4E.

The improvement in flow is illustrated in the model of FIG. 5. The extended length dimples 32/34 act as the fluid directing rails 16 (of FIG. 2) resulting in similar streamlines 20. The short elliptical dimples 40/42 force air (entering from the bottom left face of FIG. 5) to be more parallel to the extended length dimples 40/42. The approach angle of the streamlines is closer to 180 degrees.

FIG. 6 illustrates a method 100 of joining a plurality of plates 36/38 used in the construction of the planar plate cores 29 and 31. FIGS. 7A-C illustrates schematic representations of certain components used to practice the method 100 of FIG. 6.

An aluminum roll is mounted to a de-coiler at step 102 to produce a die stamped and cut the bottom plate 36 at step 104 and a die stamped and cut the top plate 38 at step 106. The die stamping produces the appropriate dimple structure and pattern into the plates for the particular core embodiment as described throughout. The bottom plate 36 and the top plate 38 then proceed in alternating positions to step 108 to a core assembly 110. If the first plate is mounted to the assembly as determined at step 112 then an alternate plate is added to the core assembly 110. If two plates are on the core assembly 110 then the plates are clamped and seams folded to lock the plates at step 114. Hot melt is applied to the seams at step 116 and the core is indexed down one plate at step 118. If the desired number of plates is formed as determined at step 120 then processing is complete at the step 122. If more plates are required to complete the core processing returns to step 108 to add a plate to the core assembly 110 and the step 114 (clamping/folding step) and the 116 step (hot melt step) are repeated (as may be required).

The bottom plate 36 is shown in FIG. 7A attached to a partially assembled core. The top plate 38 can be seen in the cut away section of bottom plate 36. The top plate 38 is held mechanically in place using clamps, metal or plastic spacers, rubber pads, etc (not shown) for example. The next formed instance of the bottom plate 36 is positioned onto the top plate 38. Each plate 36/38 is formed so that it makes up half of a fluid flow channel. The plates 36/38 have extensions 60 that fold over each other to form a locked seam 50 as shown in FIG. 7B. This holds the core together and seals the hot side from the cold side. The folding operation is done simultaneously while the plates 36/38 are held in place.

Next, a plurality of glue guns 52 are directed into the corners (six in this example, with five being illustrated in FIG. 7A) of the developing core to inject a glue bead 56 of hot melt (hot melt have very quick set times and are suitably hard). FIG. 7C shows the glue bead 56. The hot melt moulds to the shape of the corner, cools, and harden to act as a spacer. The glue bead 56 also seals the corners 54 where the folds meet (see gap in FIG. 7B). The developing core moves down on an indexing platform 58 one plate height and the process is repeated with the next plate, and so on until the desired number of plate pairs 36/38 are joined. A full size commercial core can consist of over 100 joined plate pairs 36/38.

Alternative Dimple Patterns

In the described embodiments, the intention of the various dimple geometries and dimple patterns on the plates is to achieve substantially counter current flow of the exchanged fluids (e.g., warm/cold) between the plates as schematically shown in FIG. 1. The dimple patterns are also arranged so that the warm side can drain condensation in any orientation of the core to provide installation flexibility. To keep pressure drop low during fluid exchange wetted perimeters of the dimples are minimized. A wetted perimeter is the perimeter of a cross sectional area that is "wet." The term wetted perimeter is common in the field of engineering and heat transfer applications and is associated with a hydraulic diameter (a commonly cited analogy is to consider the cross sectional area of a river). In open channel flow, the wetted perimeter is defined as the surface of the channel bottom and sides in direct contact with fluid/air flow. Friction losses typically increase with an increasing wetted perimeter, resulting in a decrease in true energy recovery (where energy consumed to recover the energy is considered).

The circular/round dimples represented in many embodiments are relatively unobtrusive meaning that they can be added to the plates to help spacing as required. Generally the dimples are produced in the plates using known stamping manufacturing techniques. With stamping a recess in the other fluid stream is created with each dimple, which can reduce the pressure drop on the opposite side.

The plates 36/38 can have a number of different dimple patterns as shown in FIGS. 8A-8E.

Figure 8A:
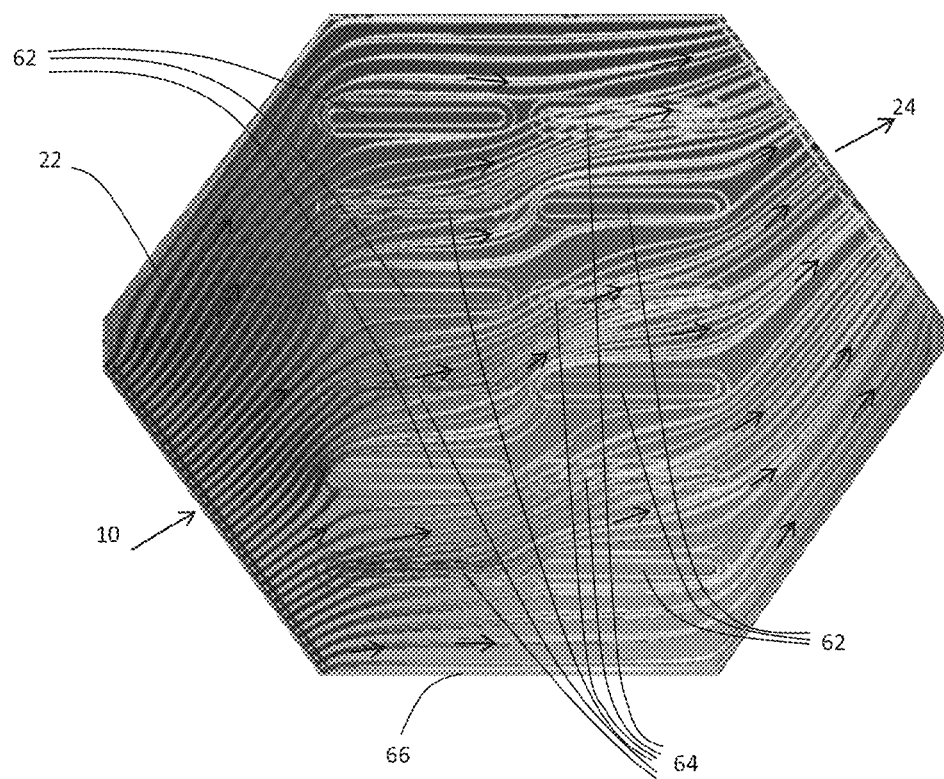
FIGS. 8A, 8B, 8C, 8D, and 8E illustrate modelled representations of alternative dimple geometries and patterns in plates of a planar plate core according to other embodiments.

An alternate dimple configuration is shown in FIG. 8A. Warm air flow 10 enters in the bottom left corner and exits at the top right corner of a core 66. Cold air flow 12 enters in the bottom right corner and exit at the top right corner of the core 66. The warm side streamlines 22 with an alternate dimple pattern is shown. In this embodiment medium length dimples 62 protrude into the warm side to force the flow to be more parallel with the sides of the core and dimples 64 protrude into the cold side of the core to force the flow direction to be more parallel with the sides of the core. A large region of the core 66 remains open for drainage as well as flow to reduce pressure drop.

Figure 8B:
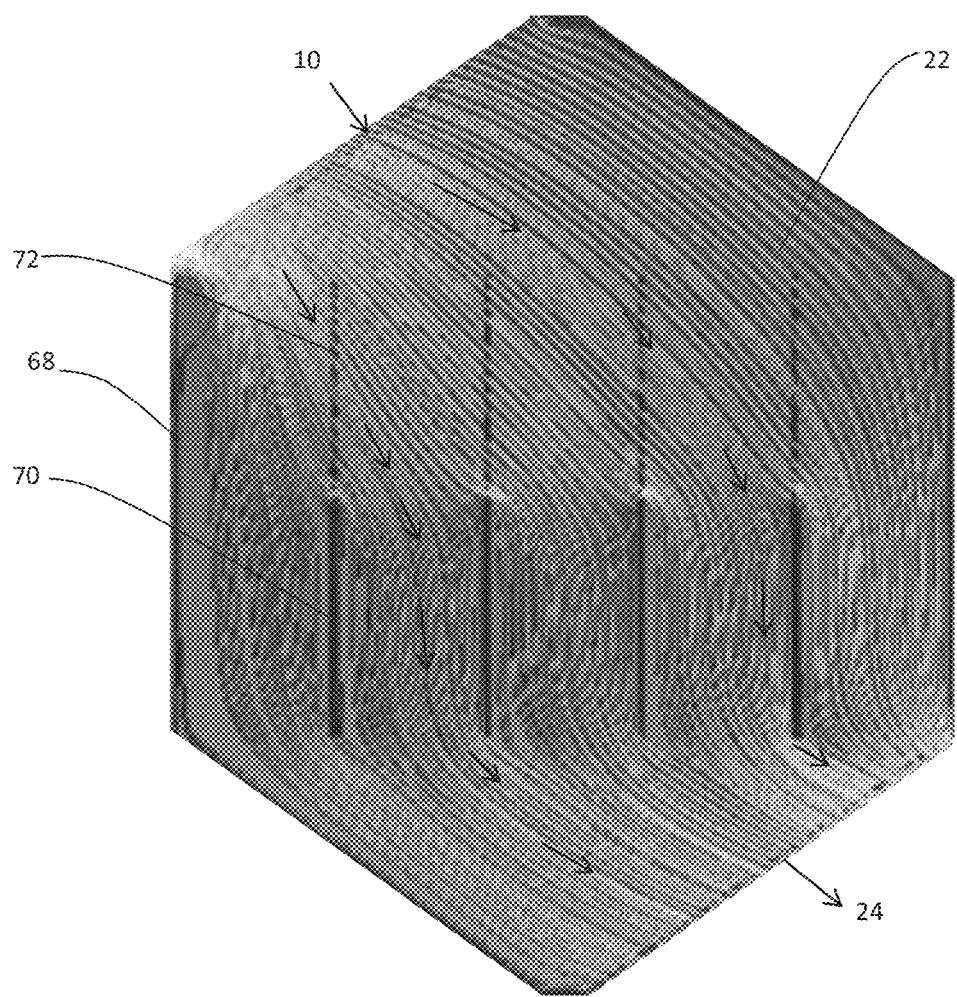

In FIG. 8B, warm air flow 10 enters from the top right hand side of a core 68 and exits the bottom left hand side 24 of the core 68. Cold air enters from the bottom left hand side and exits the top left hand side. Dimples 70 on the warm side are ½ the width of the sides of the core 68. This leaves more room for a fluid to move within the core 68. For example, if the core 68 had been on its side, the warm air side would not encounter a dimple till it is half way through the core 68. A significant amount of condensation can be generated and drained before the dimples 70 are encountered. Dimples 72 for the cold side flow are on the top portion of the core 68 and extend to the middle of the core 68.

Figure 8C:
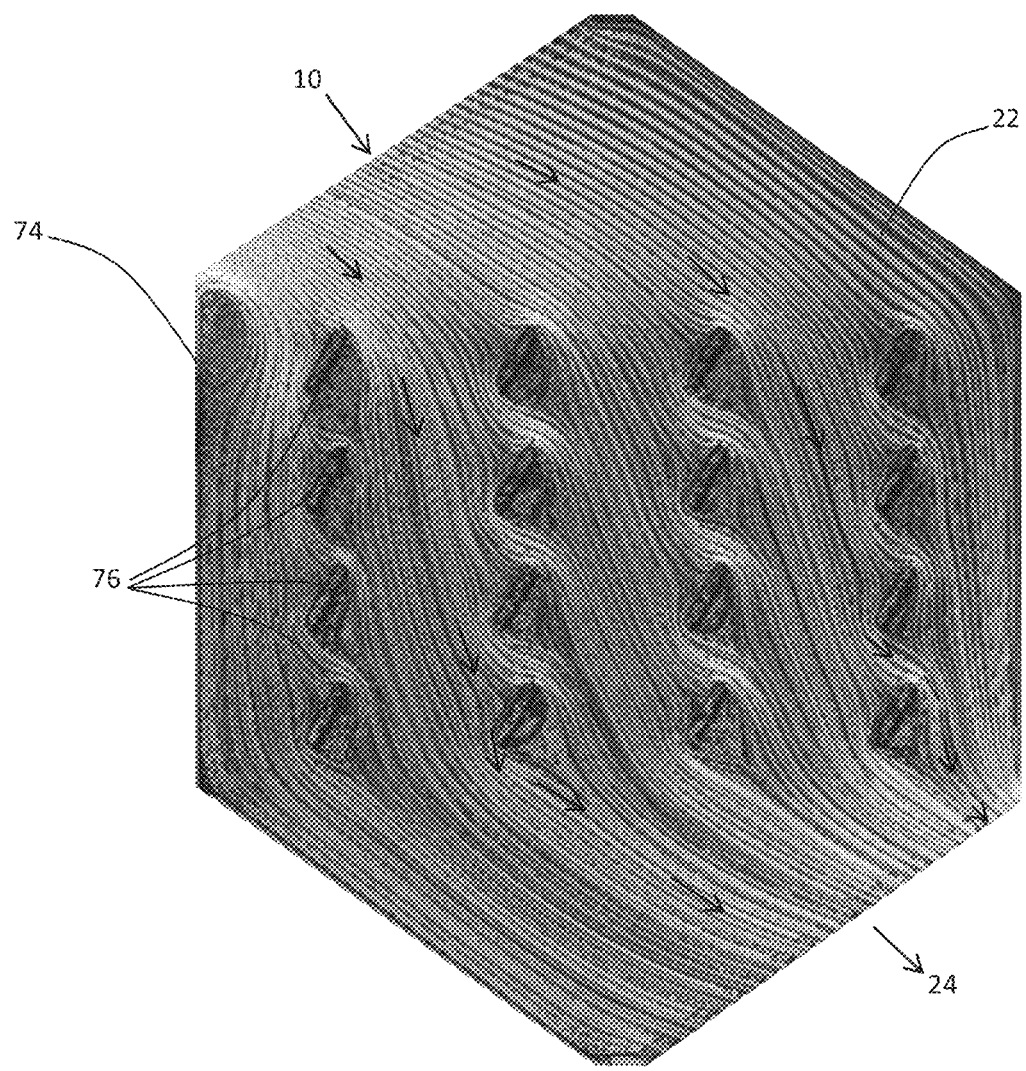

The warm side streamlines 22 are shown for a core 74 with a plurality of slanted dimples 76 in FIG. 8C. The slanted dimples 76 are both cold and warm side dimples and cold side dimples are located downstream of warm side dimples. The slanted dimples 76 force fluid flow towards the sides of the core 74 more than dimples that are parallel to the sides. This arrangement permits the slanted dimples 76 to be spaced further apart compared to similar length dimples that are parallel to the sides.

Figure 8D:
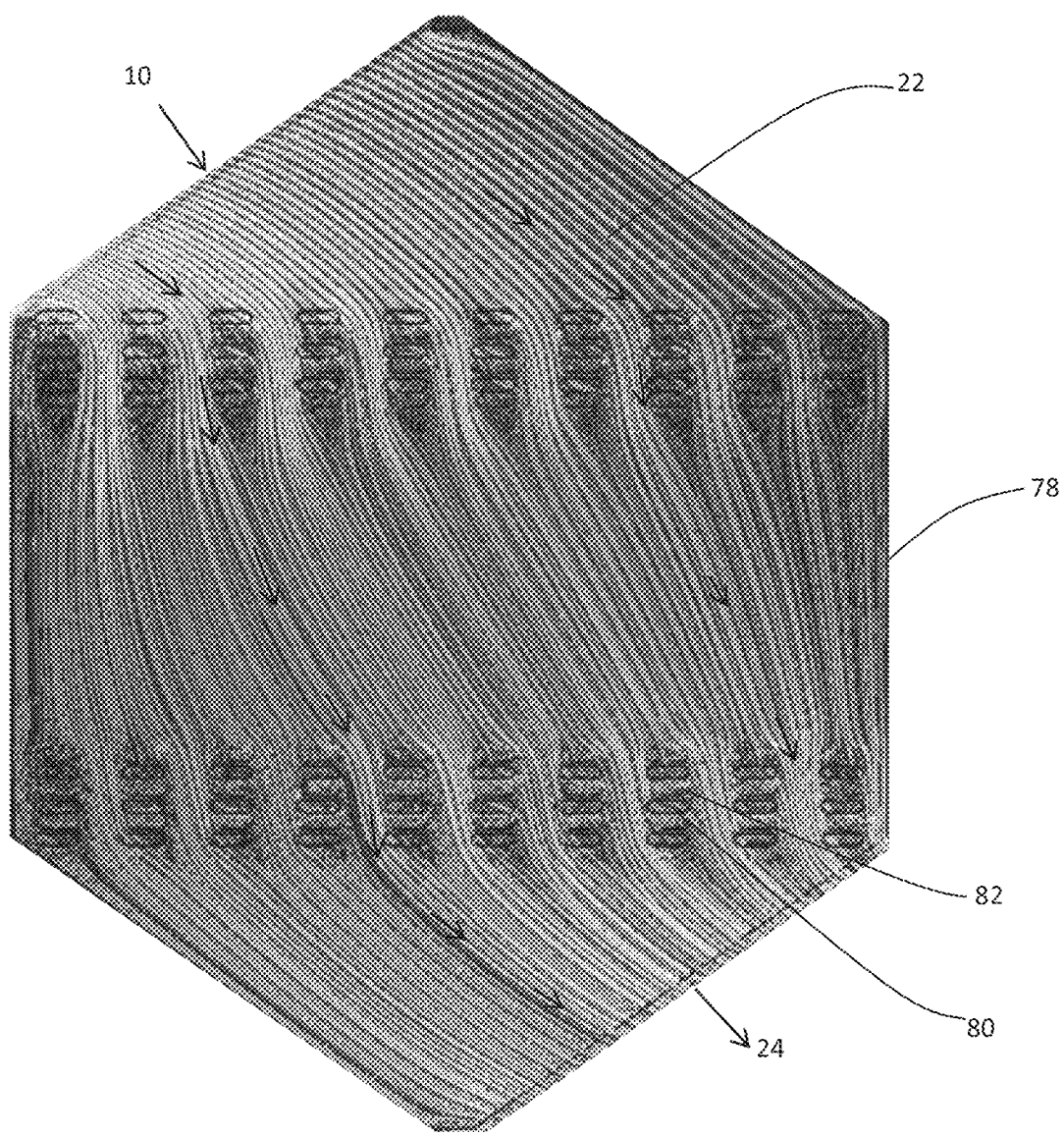

FIG. 8D shows a core 78 having plate pairs with dimples 80/82 that alternate between protruding into a warm side and a cold side. The cold side dimples 82 leave a recess in the warm side whereas the warm side dimples 80 leave a recess in the cold side. The warm side streamlines 22 are shown. Plate spacing in between the warm side dimples 80 and the cold side dimples 82 can be accomplished using round dimples as discussed above. This configuration leaves significant volume for airflow and drainage.

Figure 8E:
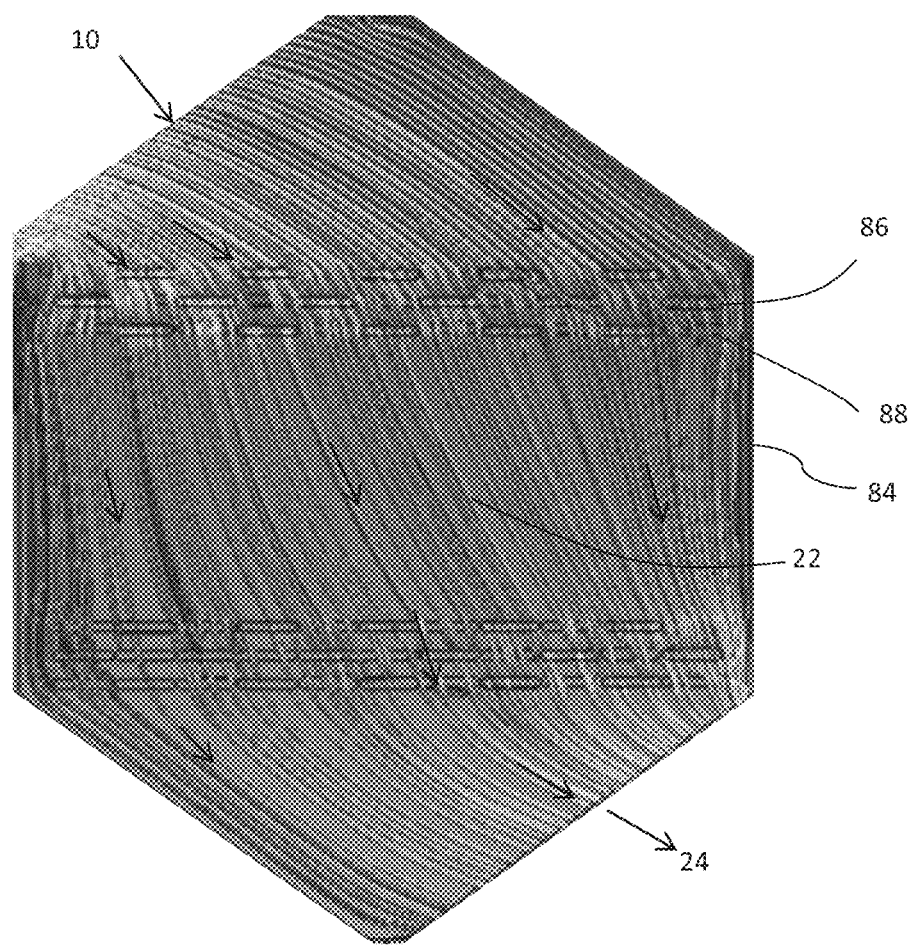

FIG. 8E shows a core 84 having plate pairs with dimples 86/88 that do not meet between the plates. The dimples 86 protrude into the warm side and alternate with the cold side dimples 88. The warm side streamlines 22 are shown to illustrate the warm side flow distribution. Leaving a gap further increases drainage paths.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

The invention claimed is:

1. A method of joining a plurality of planar plate pairs used in a core, the method comprising:
    folding edges of two planar plates together to produce a seam that operatively locks the two planar plates together to form a pair of planar plates;
    placing another pair of planar plates on top of the pair of planar plates;
    applying an adhesive by a glue gun between the seams of the pair of planar plates and the another pair of planar plates, the adhesive being a hot melt which when cooled forms a structure to act as a spacer between each pair of planar plates to retain the plurality of planar plate pairs together in a stacked and spaced arrangement; and
    repeating placing and applying the adhesive with additional pairs of planar plates to form the plurality of stacked and spaced planar plate pairs, where the hot melt is applied to consecutive pairs of planar plates so as to form a connected column of hot melt on the plurality of stacked and spaced planar plate pairs.

2. The method of claim 1, wherein, prior to folding the edges, a step of stamping is carried out in which a plurality of dimples are stamped into each of the planar plates in a pattern to generate substantially counter current flow between a first fluid flow and a second fluid flow when the core is in use and wherein subsequent to said stamping.

3. The method of claim 2, wherein:
    the plurality of dimples are stamped in the planar plates so as to draw condensation from any one of the first fluid flow and the second fluid flow in any plate orientation when the core is in use.

* * * * *